(12) United States Patent
Joasil

(10) Patent No.: US 8,099,916 B2
(45) Date of Patent: Jan. 24, 2012

(54) VENTILATION SYSTEM FOR MULTI-PANED WINDOWS

(76) Inventor: Mickael Collins Joasil, Ottawa (CA)

( * ) Notice: Subject to any disclaimer, the term of this patent is extended or adjusted under 35 U.S.C. 154(b) by 118 days.

(21) Appl. No.: 11/873,974

(22) Filed: Oct. 17, 2007

(65) Prior Publication Data

US 2008/0104900 A1    May 8, 2008

Related U.S. Application Data

(60) Provisional application No. 60/856,313, filed on Nov. 3, 2006.

(51) Int. Cl.
*E06B 7/14* (2006.01)
(52) U.S. Cl. .......... 52/209; 52/741.4; 454/122; 454/212
(58) Field of Classification Search .................. 52/171.3, 52/172, 209, 741.4; 251/335.2; 454/122, 454/196, 197, 198, 212, 213, 214
See application file for complete search history.

(56) References Cited

U.S. PATENT DOCUMENTS

| | | | | | |
|---|---|---|---|---|---|
| 265,636 | A | * | 10/1882 | Read | 454/213 |
| 885,479 | A | * | 4/1908 | Huber | 454/213 |
| 2,302,740 | A | * | 11/1942 | Boicey | 52/204.52 |
| 2,795,018 | A | * | 6/1957 | Shaw | 65/36 |
| 4,155,205 | A | * | 5/1979 | Polman | 52/171.3 |
| 4,567,703 | A | * | 2/1986 | Ricks | 52/204.52 |
| 6,357,186 | B1 | * | 3/2002 | Gould | 52/209 |
| 6,374,557 | B1 | * | 4/2002 | O'Donnell | 52/209 |
| 6,553,728 | B1 | * | 4/2003 | Zurn | 52/171.3 |
| 2008/0302059 | A1 | * | 12/2008 | Du Plessis et al. | 52/786.11 |

FOREIGN PATENT DOCUMENTS

| | | | | |
|---|---|---|---|---|
| FR | 2671128 | A1 | * | 7/1992 |
| WO | WO 2005031102 | A1 | * | 4/2005 |
| WO | WO 2005042896 | A2 | * | 5/2005 |

* cited by examiner

*Primary Examiner* — Eileen D Lillis
*Assistant Examiner* — Theodore Adamos
(74) *Attorney, Agent, or Firm* — Robert M. Hunter

(57) ABSTRACT

A unidirectional valve for venting moisture from a window having at least two panes or lights, the panes or lights defining an air space therebetween, is provided. The valve includes: an elongated body having an interior passage formed lengthwise therein, wherein at least a portion of the elongated body is adapted to be inserted directly through a window pane and into the air space formed between the panes; at least one resilient plate pivotally connected to the elongated body; wherein the resilient plate moves in response to changes in fluid pressure within the air space formed between the panes of the window, and wherein the movement of the plate opens the interior passage for allowing moisture-laden air to pass therethrough and out of the air space or closes the interior passage for preventing air from flowing back into the air space between the panes.

12 Claims, 5 Drawing Sheets

VENTILATION SYSTEM FOR MULTI-PANED WINDOWS

CROSS-REFERENCE TO RELATED APPLICATIONS

This patent application claims the benefit of U.S. Provisional Patent Application Ser. No. 60/856,313 filed on Nov. 3, 2006 and entitled "Valve for Multiple Glazing Window", the disclosure of which is incorporated by reference as if fully rewritten herein.

BACKGROUND OF THE INVENTION

The described invention relates in general to ventilation systems for use with thermal window units, multi-paned windows, and/or windows having multiple lights, and more specifically to a unidirectional valve and valve system for allowing moisture and humid air to flow out of interior spaces formed between the panes or lights of a multiple glazing unit or similar item.

"Insulated glazing unit" or "insulating glass unit" (commonly referred to as IGU) is a set of two or more lights (i.e., separately framed pieces or panes of glass in a window or door) spaced apart from one another and hermetically sealed to form a single glazed unit with an air space between each light. An IGU typically functions to improve the thermal performance of glass when used in architectural applications. Another name often used in North America is "sealed insulating glass" (abbreviated SIG). The most common IGUs are double glazed, i.e., made with two lights of glass, and are therefore also referred to as "double glazing units" or "DGU" (particularly in Europe). IGUs having three or more lights, i.e. "triple glazing" are sometimes used in colder climates. IGUs are also commonly used as replacement windows.

An IGU made of glass is called insulated glass, referring specifically to the thermal insulating properties of the IGU. Another term used for this technology is "insulating glass" although the glass itself has few insulating properties; rather it is the air space between the glass layers that provides thermal insulation. The air space between the panes or lights may be filled with air or an inert gas like argon or krypton which provides the insulating properties. Typically, the air space is filled with desiccant to reduce condensation and improve insulating performance. Less commonly, most of the air is removed, leaving a partial vacuum, which drastically reduces heat transfer through convection and conduction. This is called evacuated glazing. Insulating "quality" refers to heat flow where the gap between lights is the insulating medium. The gap between panes or lights is usually 12 mm to 20 mm thick; however, the thickness of the gap does impact the insulating properties substantially. An air gap of about 16 mm is considered optimal and is usually recommended for most applications.

A common problem with multiple glazing units (hereinafter referred to as thermal window units) is that over time condensation occurs in the air space between the panes of glass and fogs, stains, or discolors the window thereby diminishing its appearance. One solution to the problem of condensation between window panes is to simply replace the window. However, this solution is costly and time consuming and as such, is usually not desirable. Another solution to the problem involves drilling or cutting a hole in one of the window panes and applying a vacuum to remove the moisture. The hole is then covered or plugged. While this method can be effective, it is often only a temporary fix and in time the method must be repeated when condensation reappears. Another approach to correcting the problem of condensation within thermal window units includes the use of small ventilation units that are inserted into holes drilled in one or more of the window panes. These units provide ventilation to the space between lights or panes; however, they also permit moisture-laden air to flow back into the air space. Therefore, an ongoing need exists for a ventilation system for use with thermal window units that provides for the removal of condensation, but that prevents the flow of moisture-laden air back into the air space between the panes/lights.

SUMMARY OF THE INVENTION

The following provides a summary of certain exemplary embodiments of the present invention. This summary is not an extensive overview and is not intended to identify key or critical aspects or elements of the present invention or to delineate its scope. It should be noted that the terms "light" and "pane" are used interchangeably herein with reference to the present invention and the exemplary embodiments thereof.

In accordance with one aspect of the present invention, a venting system for thermal window units is provided. This system includes at least one window, wherein the window further includes at least a first pane and a second pane, and wherein the panes define an air space therebetween. At least one unidirectional valve for allowing moisture-laden air to flow out of the air space formed between the panes is also provided. A portion of the valve is adapted to be inserted through a specifically-sized aperture formed in the window pane into the air space. The valve further includes an elongated body having an interior passage formed lengthwise therein and at least one flexible valve plate in pivotal contact with the elongated body. The flexible valve plate moves in response to changes in fluid pressure within the air space formed between the panes of the window and the movement of the plate opens or closes the interior passage, thereby opening or closing the valve.

In accordance with another aspect of the present invention, a unidirectional valve for venting moisture from a window having at least two panes, wherein the panes define an air space therebetween, is provided. This valve includes an elongated body having an interior passage formed lengthwise therein and at least a portion of the elongated body is adapted to be inserted through a window pane and into the air space formed between the panes. At least one resilient valve plate is pivotally or hingeably connected to the elongated body. The resilient valve plate moves in response to changes in fluid pressure within the air space formed between the panes of the window. The movement of the valve plate (i) opens the interior passage for allowing moisture to pass therethrough and out of the air space; or (ii) closes the interior passage for preventing moisture-laden air from flowing back into the air space between the panes.

In yet another aspect of this invention, a method for venting moisture from a multi-paned window is provided. This method includes providing a sealed window, wherein the window further includes an inner pane and an outer pane, and wherein the panes define an air space therebetween. At least one specifically-sized opening is drilled or otherwise formed in at least one of the panes and a unidirectional valve is inserted into each opening. Each valve further includes an elongated body having an interior passage formed lengthwise therein and at least one valve plate pivotally or hingeably connected to the elongated body. The valve plate moves in response to changes in fluid pressure within the air space formed between the panes of the window, and the movement of the plate opens or closes the interior passage thereby opening or closing the valve. Moisture-laden or humid air passes through the interior passage of the valve body and out of the interior air space when the valve is the open position. After the fluid pressure in the interior space between the panes has equalized relative to the fluid pressure on the exterior or outside of the window, the valve closes thereby preventing the backflow of humid air through the valve into the air space between the panes.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
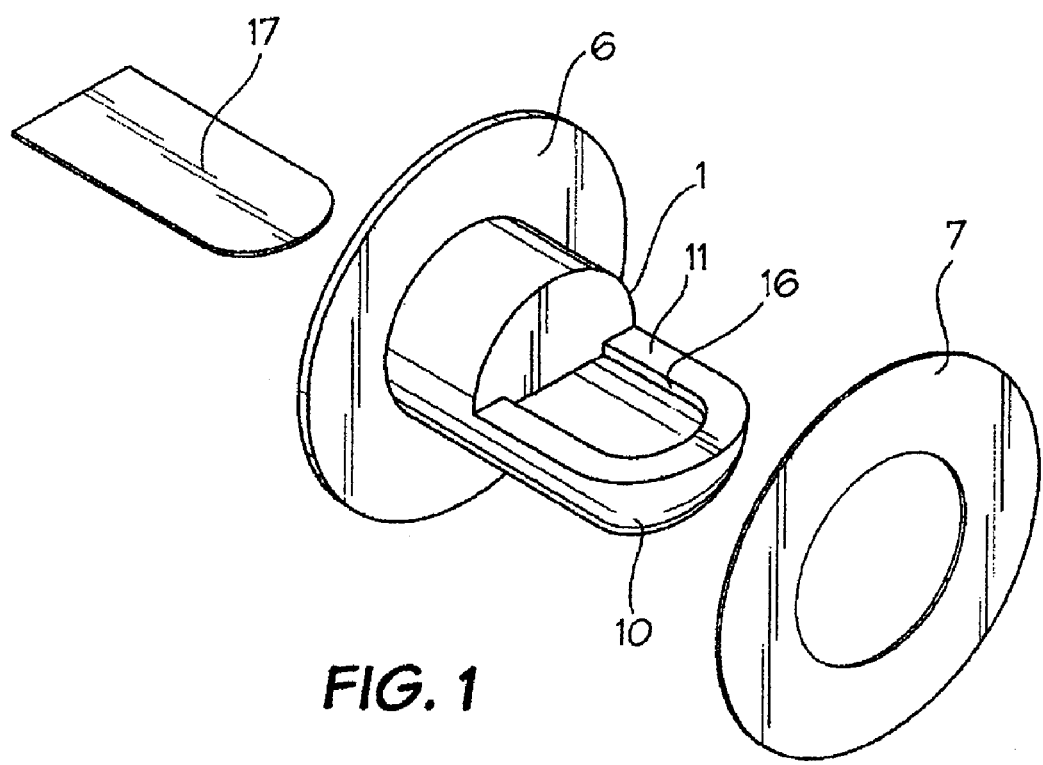
FIG. 1 is an exploded, perspective view of a window valve in accordance with a first exemplary embodiment of the present invention.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to unidirectional valves for use with multiple glazing units, insulated glazing units, insulated glass units, thermal window units, and the like, all of which are referred to generically herein as "multi-paned" windows. As previously indicated, a first general embodiment of this invention provides a venting system for multi-paned windows; a second general embodiment of this invention provides a unidirectional valve for venting moisture-laden air from a window having at least two panes; and a third general embodiment of this invention provides a method for venting humid air from within a multi-paned window. With reference now to the Figures, one or more specific embodiments of this invention shall be described in greater detail.

Figure 2:
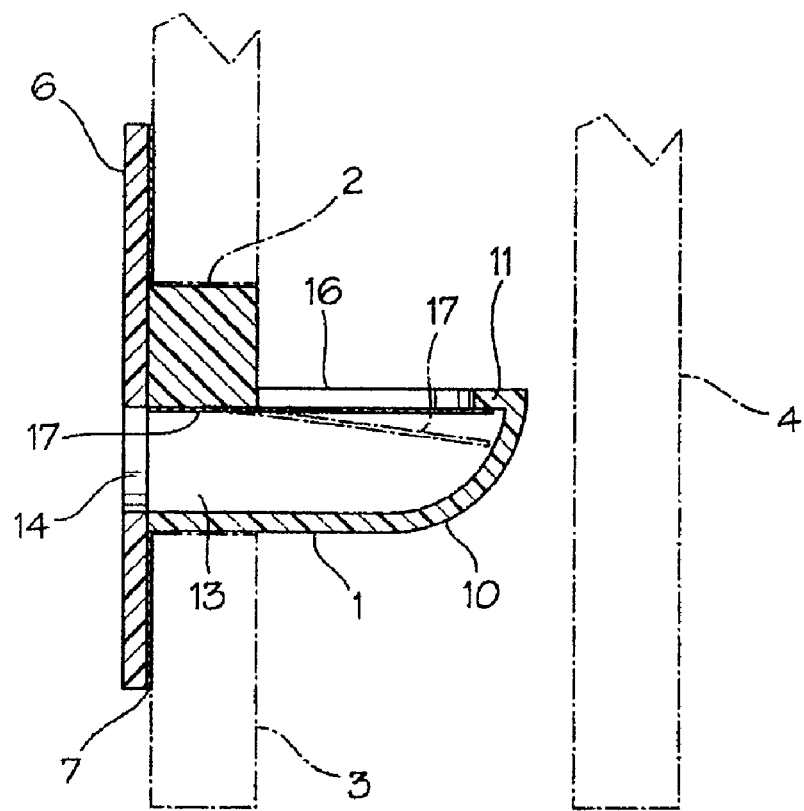
FIG. 2 is a cross-sectional side view of the window valve of FIG. 1 shown inserted into a multi-paned window.
Figure 3:
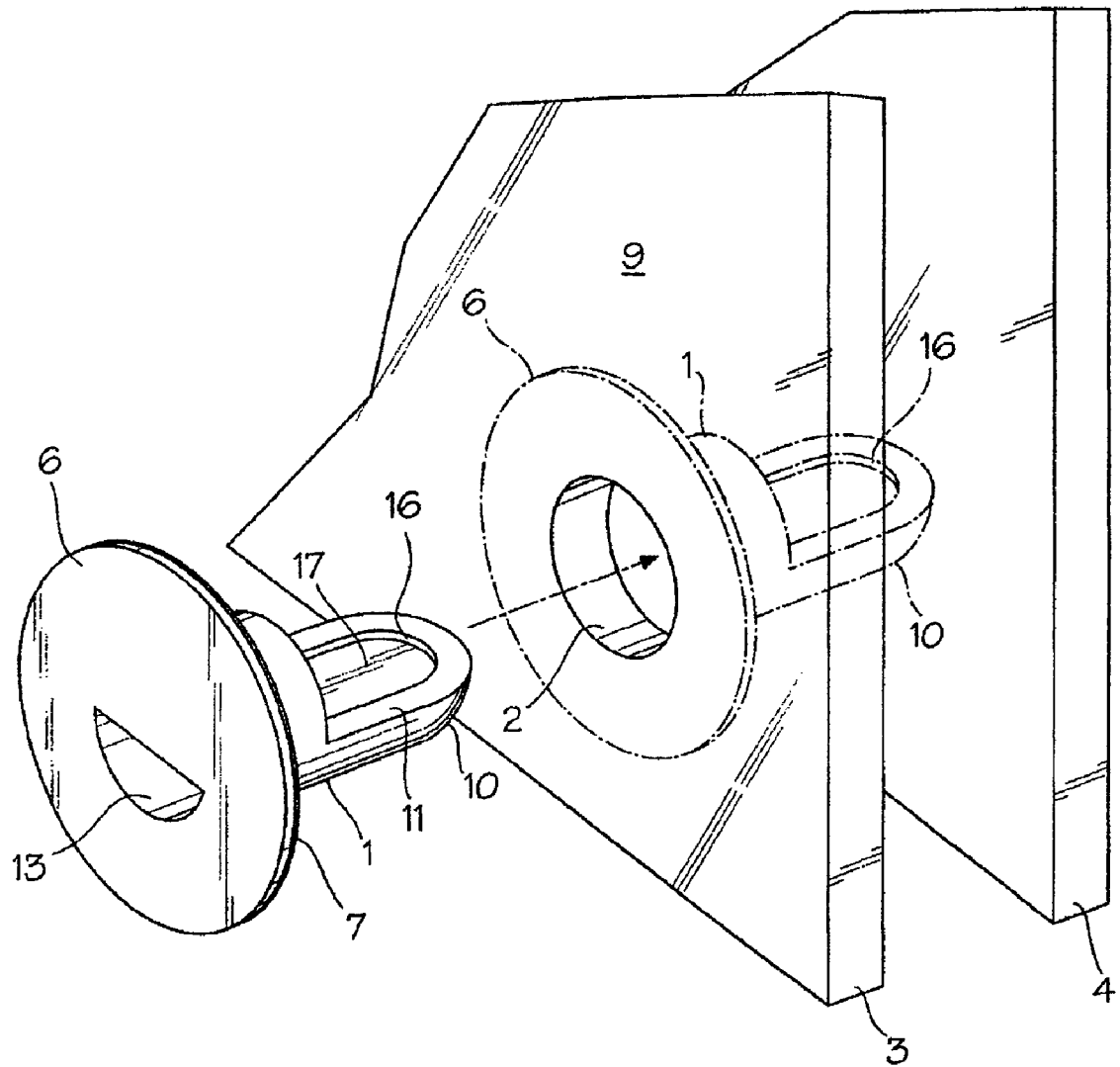
FIG. 3 is a partially exploded perspective view of the window valve of FIG. 1 shown inserted into a multi-paned window.

FIGS. 1-3 illustrate a first exemplary embodiment of a unidirectional valve for use with the present invention. As shown in FIG. 1, this valve includes an elongated tubular or semi-cylindrical body having a semi-cylindrical interior passage 13 formed lengthwise through at least a portion thereof. A generally circular plate 6 is formed integrally with or attached to one end of body 1, while a trough 10 is formed integrally with the other end of body 1. A semi-circular opening or hole 14 is centrally formed in circular plate 6 and a flat lip or flange 11 is formed around the top edge of trough 10 and defines a U-shaped opening 16 therein. Body 1 may be manufactured from polycarbonate or any other suitably rigid and durable plastic or other material. A flapper valve, i.e., a flexible and/or resilient valve plate 17, is inserted into the top portion of interior passage 13. As shown in FIG. 2, a portion of valve plate 17 is secured against body 1 for forming a hinge-like or pivotal connection between the body 1 and valve plate 17. Importantly, the end of valve plate 17 that is not pivotally attached to body 1 extends completely into trough 10 and is seated against the underside of flange 11 when the valve is in the closed position. Valve plate 17 is typically manufactured or fabricated (e.g., die cut) from a thin piece of polyvinyl acetate or any other suitably flexible and/or resilient polymer, plastic, or other material. As shown in FIGS. 2-3, this embodiment of the unidirectional valve of the present invention is inserted into first pane 3 through a circular hole 2 that has been cut into the first pane. The diameter of hole 2 is only slightly greater than the diameter of body 1 to allow the valve to fit securely within hole 2 and minimize any airflow through hole 2 around the exterior of body 1. Again with reference to FIG. 1, an annular strip 7 of double-sided tape or other adhesive material is placed between plate 6 and the outer surface of pane 3 for securing the unidirectional valve within hole 2 and sealing the valve against pane 3. When properly installed, one end the unidirectional valve of the present invention is situated within the space formed between first pane 3 and second pane 4 and the other end of the valve is situated on the outer surface 9 of first pane 3 (see FIGS. 2-3).

Figure 4:
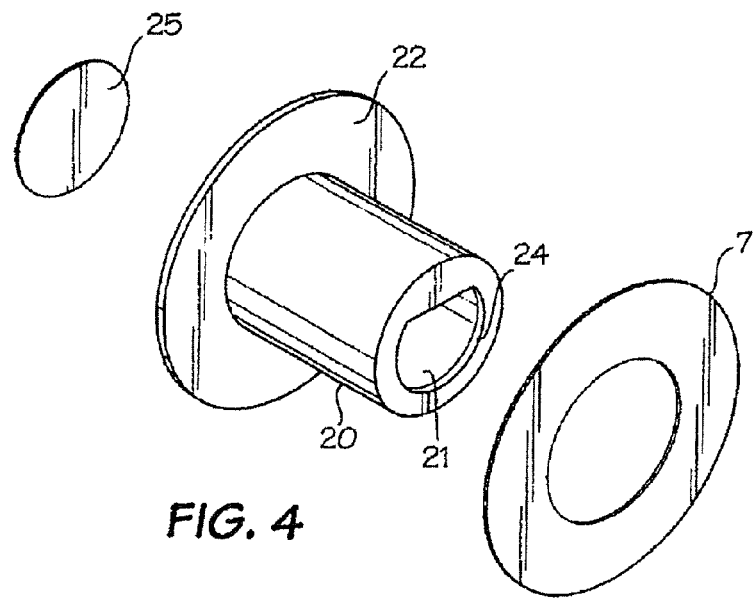
FIG. 4 is an exploded, perspective view of a window valve in accordance with a second exemplary embodiment of the present invention.
Figure 5:
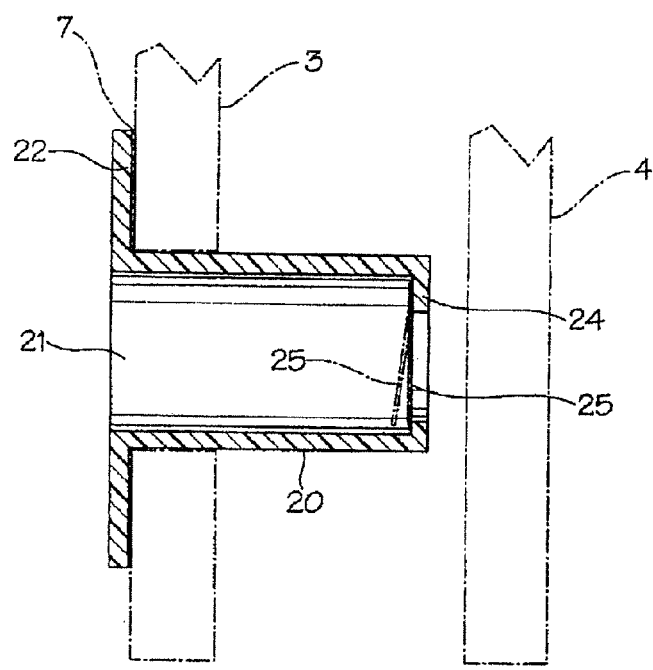
FIG. 5 is a cross-sectional side view of the window valve of FIG. 4 shown inserted into a multi-paned window.
Figure 6:
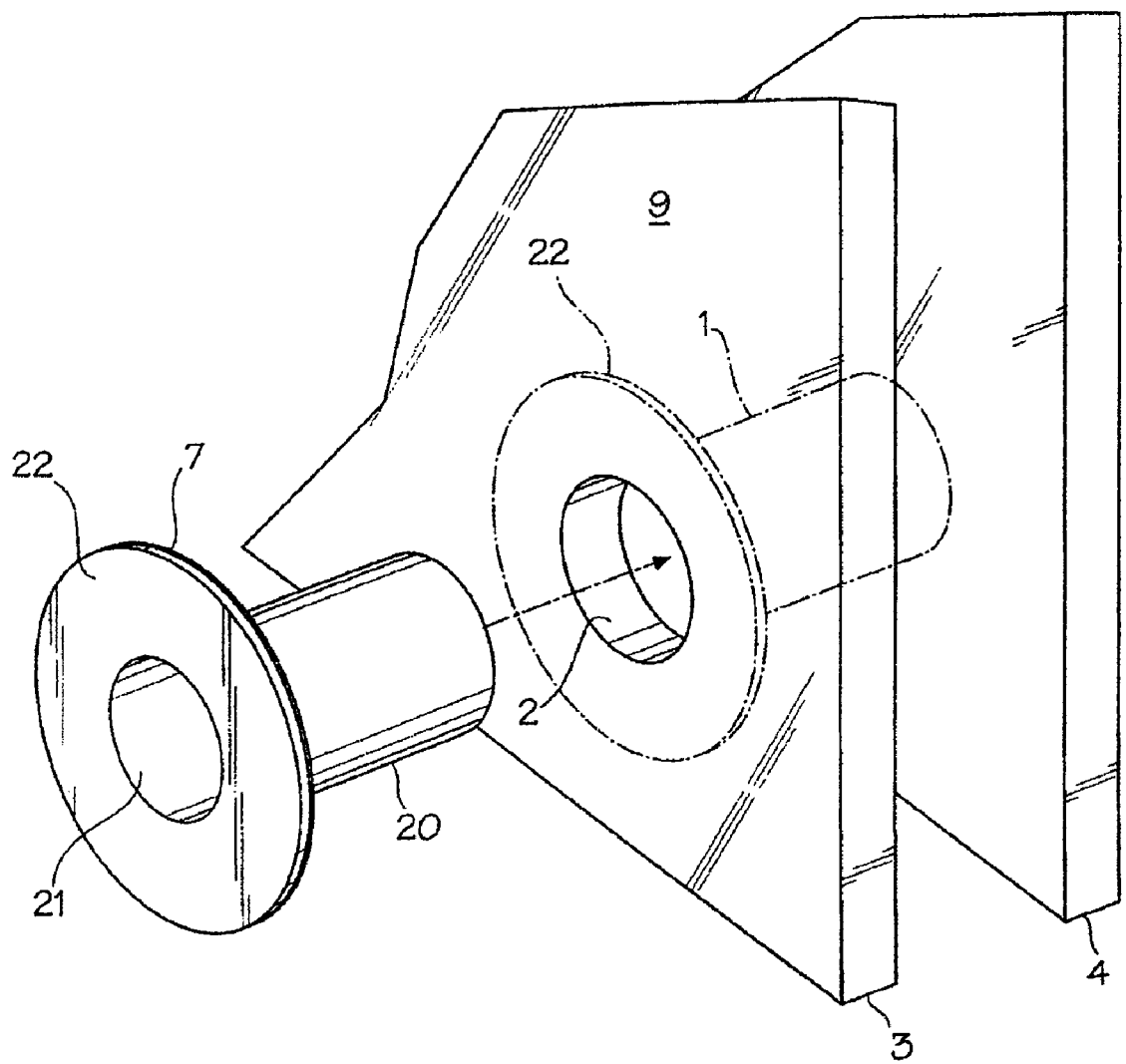
FIG. 6 is a partially exploded perspective view of the window valve of FIG. 4 shown inserted into a multi-paned window.

FIGS. 4-6 illustrate a second exemplary embodiment of a unidirectional valve for use with the present invention. As shown in FIG. 4, this valve includes a generally cylindrical body 20 having a passage 21 formed lengthwise therein. An annular flange or plate 22 (similar to circular plate 6 shown in FIG. 1) is formed integrally with or attached to one end of body 20 and a radial inwardly extending flange 24 is formed around the opposite end of body 20. Body 20 may be manufactured from polycarbonate or any other suitably rigid and durable plastic or other material. A flexible and/or resilient plate 25 is pivotally mounted within passage 21 just behind flange 24 (see FIG. 5). Valve plate 25 is typically manufactured or fabricated (e.g., die cut) from a thin piece of polyvinyl acetate or any other suitably flexible and/or resilient polymer, plastic, or other material. As shown in FIGS. 5-6, this embodiment of the unidirectional valve of the present invention is inserted into first pane 3 through a circular hole 2 that has been cut into the first pane. The diameter of hole 2 is only slightly greater than the diameter of body 20 to allow the valve to fit securely within hole 2 and minimize any airflow through hole 2 around the exterior of body 20. Again with reference to FIG. 4, an annular strip 7 of double sided tape or other adhesive material is placed between plate 22 and the outer surface of pane 3 for securing the unidirectional valve within hole 2 and sealing the valve against pane 3. When properly installed, one end of the unidirectional valve of the present invention is situated within the space formed between first pane 3 and second pane 4 and the other end of the valve is situated on the outer surface 9 of first pane 3 (see FIGS. 2-3).

Figure 7:
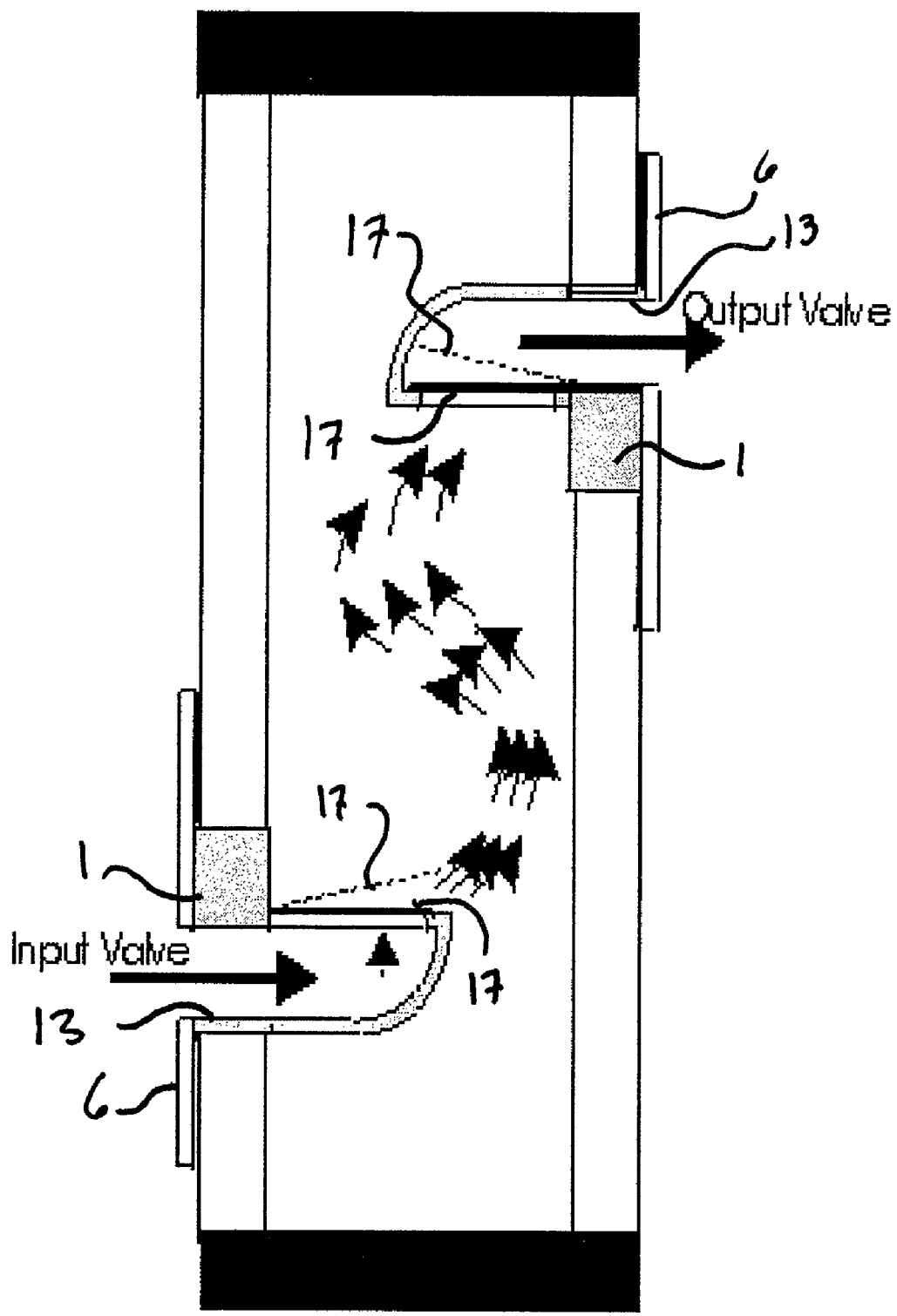
FIG. 7 schematically depicts one embodiment of the present invention.

FIG. 7 depicts the first exemplary embodiment of the valve of the present invention installed within a thermal window unit as part of a system for effectively ventilating the air space between the glass panes of the window. This system includes at least one valve installed in the inward facing (i.e., on the inside of a building) pane in an upward orientation and at least one valve installed in the outward facing pane (i.e., on the outside of a building) in a downward orientation. The valve or valves installed in the inward facing pane are installed near the bottom of the window and the valve or valves installed in the outward facing pane are installed near the top of the window. As the sun heats the window throughout the day, water that has condensed within the space between the panes evaporates thereby causing the fluid pressure within the air space between the panes to increase and eventually exceed the fluid pressure on the exterior of the window. When the interior fluid pressure exceeds the exterior fluid pressure, one end (i.e., the non-hinged end) of valve plate 17 separates from flange 11, thereby opening the valves (indicated in broken lines in FIG. 7). As depicted in FIG. 7, once the valves are open, air flows from the interior of the building through the valves installed in inward facing pane, upward through the interior space between the panes, and then exits through the valves installed in the outward facing pane. This airflow effectively reduces amount of moisture laden air (i.e., humidity) in the air space between the panes; thus, the amount of condensation occurring within the window is significantly reduced or eliminated.

In a version of this invention not shown in the Figures, the first exemplary embodiment of the valve of the present invention is again installed within a thermal window unit as part of a system for ventilating the air space between the glass panes of the window. However, in this embodiment, at least one valve is installed in the outward facing pane (i.e., on the outside of a building) in an upward orientation near the bottom of the window, and at least one valve is installed in the outward facing pane in an upward orientation near the top of the window. When, as previously described, the interior fluid pressure exceeds the exterior fluid pressure valve plate 17 flexes and partially separates from flange 11, thereby opening each valve. Once the valves are open, moisture laden air on the inside of the window is vented to the atmosphere outside of the window. When the interior and exterior fluid pressure equalizes, valve plates 17 return to their closed position. Because valve plates 17 only move to the open position when fluid pressure on the interior of the window exceeds the fluid pressure on the exterior of the window, humid air from the environment outside the window cannot flow backwards into the interior space formed between the panes. As will be appreciated by the skilled artisan, other arrangements and configurations of the valve system described herein are possible.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

The invention claimed is:

1. A venting system for windows, comprising:
    a) at least one window, wherein the window further includes at least an inner pane and an outer pane, and wherein the panes define an air space therebetween;
    b) at least first and second unidirectional valves for allowing moisture-laden air to flow out of the air space formed between the panes, wherein a portion of each valve is adapted to be inserted through an aperture formed in the window pane and into the air space, and wherein each valve further includes:
        i) an elongated body having an interior passage formed lengthwise therein, having a circular plate attached to one end of said body and a trough formed integrally with the other end of said body and defining a U-shaped opening substantially perpendicular to the circular plate;
        ii) at least one flexible plate, a portion of said plate in pivotal contact with the elongated body, and an end of said plate extending into the trough;
        wherein each of the flexible plate moves in response to changes in fluid pressure within the air space formed between the panes of the window, wherein the movement of each flexible plate opens or closes the respective interior passage, the first unidirectional valve is inserted in a lower portion of the inner pane such that the respective flexible plate is facing in an upward direction, and the second unidirectional valve is inserted in an upper portion of the outer pane such that the resilient plate is facing in a downward direction, and wherein the placement of the first and second unidirectional valves in the inner and outer panes permits airflow through the air space.

2. The system of claim 1, further comprising sealing means for sealing the at least one unidirectional valve to a window pane.

3. The system of claim 1, wherein the at least one window is an insulated glazing unit.

4. The system of claim 1, wherein the at least one flexible plate is seated against the elongated body when the fluid pressure within the air space defined by the panes is less than the fluid pressure on the outside of the panes for closing the valve; and wherein a portion of the at least one flexible plate is separated from the elongated body when the fluid pressure within the air space defined by the panes exceeds the fluid pressure outside of the panes for opening the valve.

5. The system of claim 1, wherein the elongated body is generally cylindrical in shape.

6. The system of claim 1, wherein the elongated body further comprises anchoring means formed at one end thereof for securing the valve within the pane once it has been inserted therein.

7. The system of claim 1, wherein the flexible plate is hingeably connected to the elongated body.

8. A method for venting moisture from a multi-paned window, the method comprising:
    a) providing a sealed window, wherein the window further includes an inner pane and an outer pane, and wherein the panes define an air space therebetween;
    b) forming a first opening in a lower portion of the inner pane and a second opening in an upper portion of the outer pane;

c) providing first and second unidirectional valves, wherein each valve includes:
  i) an elongated body having an interior passage formed lengthwise therein, having a circular plate attached to one end of said body and a trough formed integrally with the other end of said body and defining a U-shaped opening substantially perpendicular to the circular plate;
  ii) at least one plate, a portion of said plate pivotally connected to the elongated body, an end of said plate extending into the trough;
  iii) wherein the plate moves in response to changes in fluid pressure within the air space formed between the panes of the window, and wherein the movement of the plate opens or closes the interior passage; and
  iv) wherein moisture passes through the interior passage and out of the air space when the valve is in the open position;
d) inserting the first unidirectional valve in the first opening such that the resilient plate is facing in an upward direction;
e) inserting the second unidirectional valve in the second opening such that the resilient plate is facing in a downward direction;
  wherein the placement of the first and second unidirectional valves in the first and second openings permits airflow through the air space when fluid pressure within the air space exceeds fluid pressure outside of the inner and outer panes.

9. The method of claim 8, wherein the elongated body further comprises a substantially circular plate formed at one end thereof and perpendicular thereto, wherein the diameter of the circular plate exceeds the diameter of the elongated body for securing the valve within the pane through which it has been inserted.

10. The method of claim 8, wherein the circular plate further comprises adhesive means deposited thereon or attached thereto for securely attaching the valve to the pane through which it has been inserted.

11. The method of claim 8, wherein the multi-paned window is an insulated glazing unit.

12. The method of claim 8, wherein the elongated body is generally cylindrical in shape.

* * * * *